United States Patent [19]

Henry et al.

[11] Patent Number: 5,113,843
[45] Date of Patent: May 19, 1992

[54] COMBUSTION DEVICE FOR STOVES AND FIREPLACES

[75] Inventors: Daniel S. Henry; G. Michael Hoteling, both of Colville, Wash.

[73] Assignee: Alladin Steel Products, Colville, Wash.

[21] Appl. No.: 678,860

[22] Filed: Apr. 1, 1991

[51] Int. Cl.⁵ .............................................. F24C 1/14
[52] U.S. Cl. ......................................... 126/77; 126/83
[58] Field of Search .................................... 126/77, 83

[56] References Cited

U.S. PATENT DOCUMENTS 4,672,946  6/1987  Craver ............................... 126/77
4,766,876  8/1988  Henry et al. ......................... 126/77

OTHER PUBLICATIONS

A drawing of a stove publicly shown at a trade show in Reno, Nev. around Mar. 1989.

Primary Examiner—Carroll B. Dority
Attorney, Agent, or Firm—Wells, St. John & Roberts

[57] ABSTRACT

A combustion device is described by several embodiments to enable efficient, clean burning of fuel in combustors. In stove and fireplace embodiments, primary, secondary and tertiary air supplies are provided within a firebox at selected locations relative to an upwardly inclined baffle to maximize combustion of particulates and gases. The primary air feed includes openings above the intended coal bed and includes an intake partially spaced from the firebox to maintain incoming primary air cool and oxygen rich, and to avoid direct impingement with the fuel bed. Secondary air is provided adjacent a forward downturned end of the insulated baffle to produce turbulence and supply oxygen to support combustion adjacent to baffle edge. Tertiary air tubes receive air from side chambers that in turn are connected to air delivery ducts situated with respect to the firebox to maintain a desired range of 250°–650° F. of incoming airstreams admitted by the tubes just under the baffle. A rearward pair of tertiary ducts deliver the air forwardly in a substantially horizontal plane. The front tertiary duct delivers air forwardly and downward to impinge with secondary air and create turbulence at the forward baffle edge to encourage maximum combustion of any remaining gases and particulates before they pass over the baffle and move to the exhaust flue. A retrofit unit for existing combustors such as fireplaces includes the tertiary air supply and ducts arranged under the angular baffle to assist more complete combustion of gases and particulates.

28 Claims, 13 Drawing Sheets

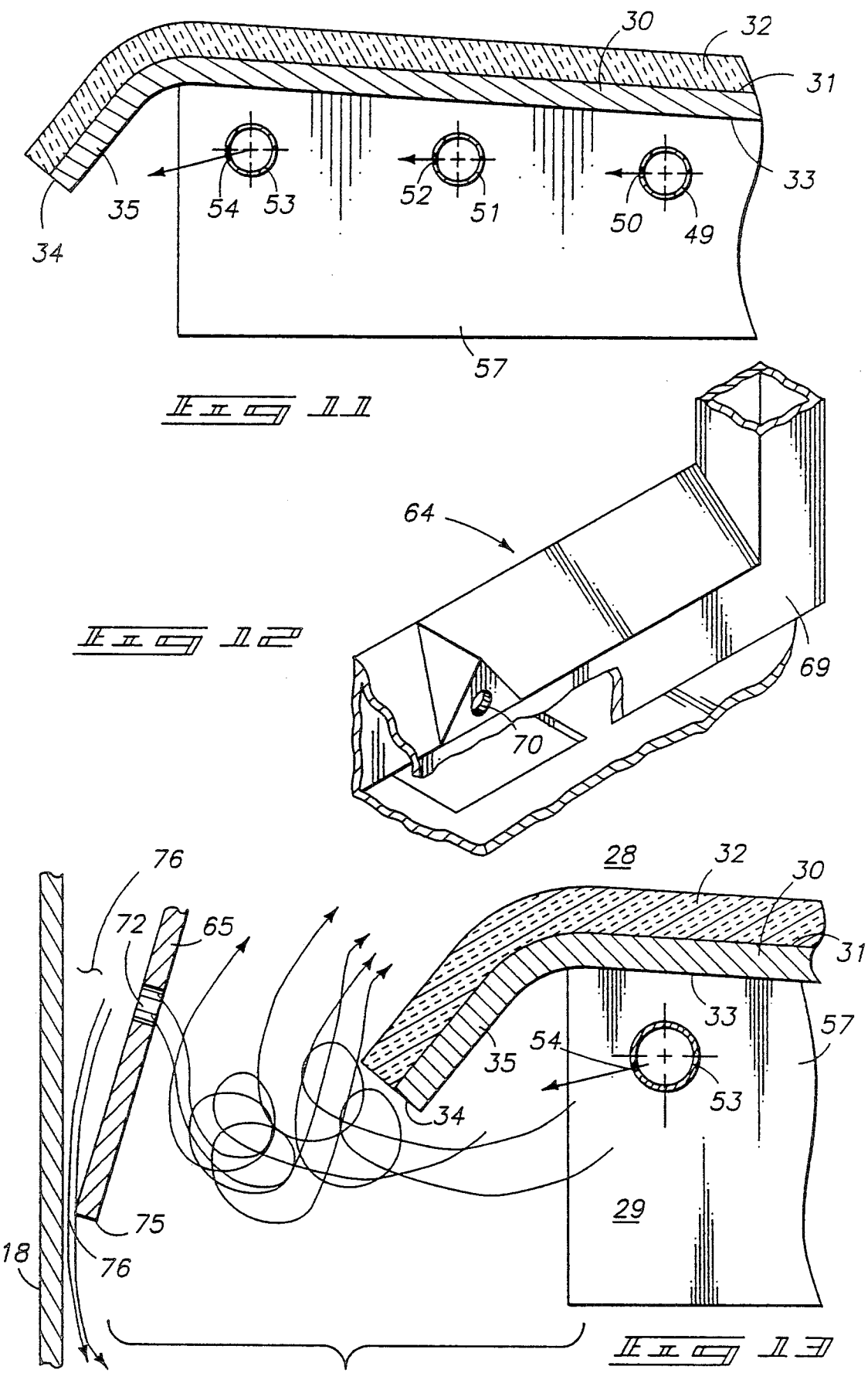

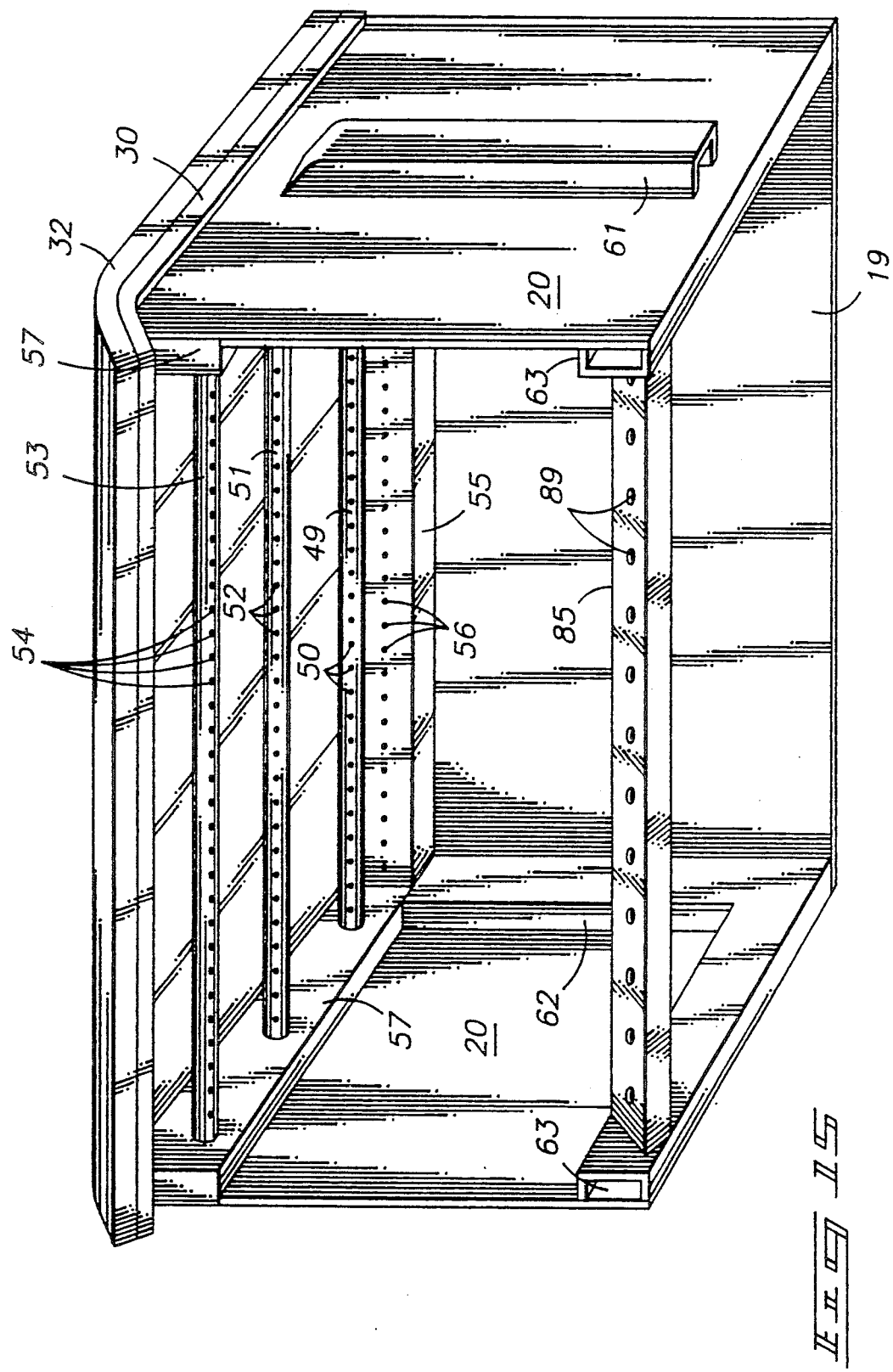

COMBUSTION DEVICE FOR STOVES AND FIREPLACES

TECHNICAL FIELD

The present invention relates to efficient combustion of combustible fuel within stoves and fireplaces.

BACKGROUND OF THE INVENTION

Many wood stove, fireplace and other fuel combustor manufacturers claim to have high burning efficiency and the capability of heating large spaces. While it is relatively easy to design a stove or a fireplace insert that is capable of efficient operation at a particular burning setting, it is very difficult to provide such a burner that is capable of efficient operation over the full range of burn rates. Additionally, it is difficult to provide a burner such as a wood stove that is not only efficient over the entire burning range, but that provides emissions, including particulate material, that meet the Environmental Protection Agency requirements. To meet the Environmental Protection Agency requirements and state agency requirements, such as the stringent requirements set forth in Oregon and Colorado, many stove manufacturers have included catalytic combustors to finalize the burning process and thereby prevent emission of particulate materials and gases beyond the required levels. While such catalytic combustors operate effectively during certain conditions, they can become fouled or otherwise rendered inefficient, especially when other than selected materials are burned within the associated stove or fireplace. Additionally, the catalytic combustors are quite expensive and must be periodically replaced. It therefore becomes very desirable to obtain a combustor that will meet stringent air quality standards without the aid of a catalytic combustor, and that will operate over a complete range of burning conditions with consistent, repeatable low emission.

The above object has been met by the wood stove disclosed in U.S. Pat. No. 4,766,876. This patent discloses a wood stove with features primarily relating to the mixture of air with burning and unburned gases to reduce emissions to stringent requirements. While this stove operates effectively, it remains desirable to lower emission rates even further.

BRIEF DESCRIPTION OF THE DRAWINGS

Preferred embodiments of the present invention are illustrated in the accompanying drawings in which:

FIG. 11 is a fragmented detail view of tertiary air supply tubes, side chamber, baffle, and insulation;

FIG. 12 is a detail view of a secondary manifold and an air bleed;

FIG. 13 is a detail view, partially fragmented, showing passage of air through the secondary air supply and forward tertiary air tube;

FIG. 15 is a perspective diagrammatic view of a retrofit unit.

DETAILED DESCRIPTION OF THE PREFERRED EMBODIMENTS

Figure 1:
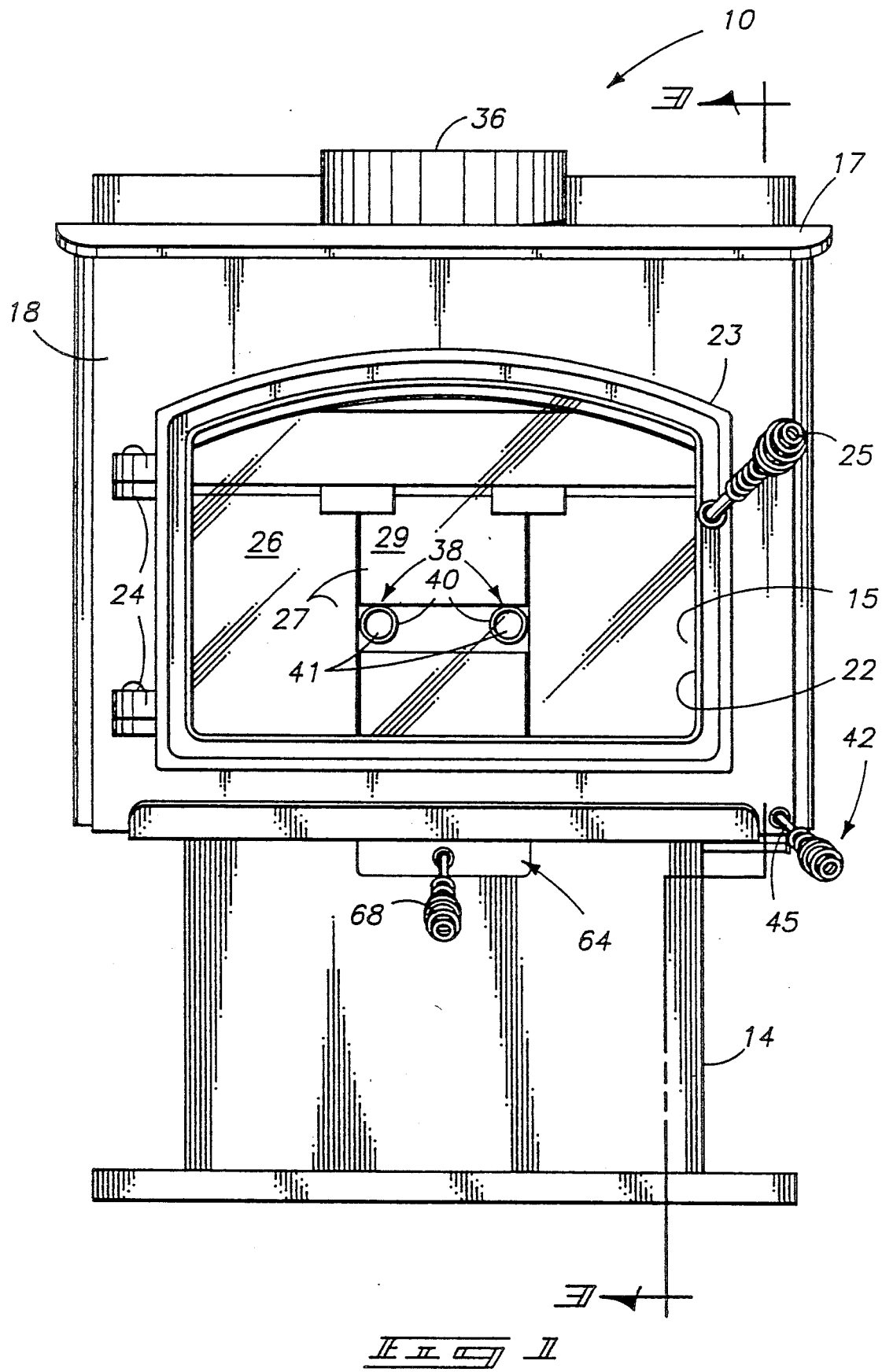
FIG. 1 is a front elevation view of a first embodiment of the present invention.
Figure 2:
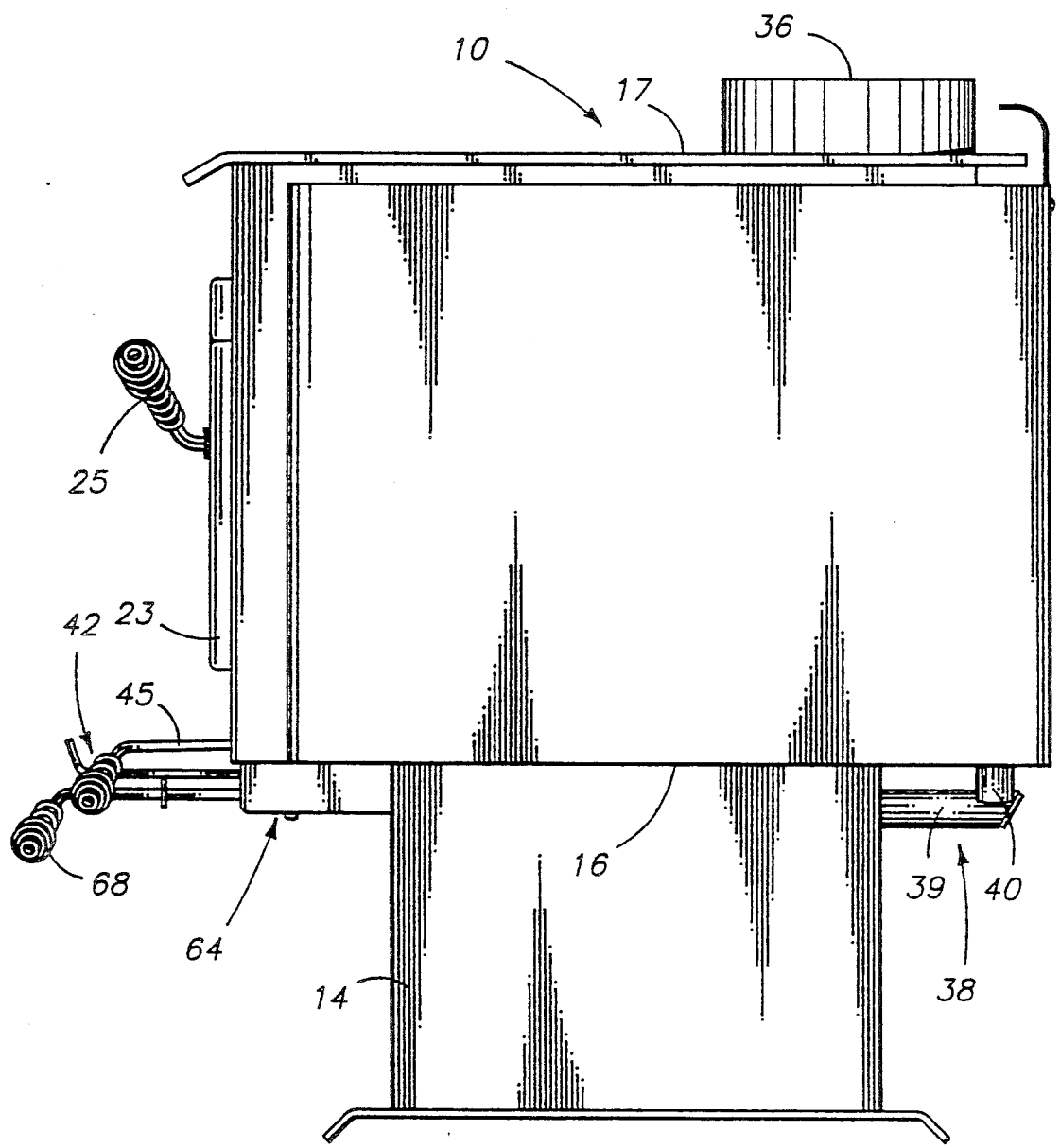
FIG. 2 is a side elevational view of the embodiment shown in FIG. 1.

This disclosure of the invention is submitted in furtherance of the constitutional purposes of the Patent Laws "to promote the progress of science and useful arts" (Article 1, Section 8).

A combustor 10 embodying principal features of the present invention is shown in several alternative preferred embodiments within this application. The term "combustor" is used herein in a generic sense to include wood stoves, furnaces, fireplace inserts, and retrofit air supply devices for combustors that incorporate features of the present invention.

The following description will relate to features of the present invention that are common to the several preferred embodiments shown. Therefore, for brevity, like reference numerals will be used for similar features of the several embodiments. Features distinguishing one embodiment from others will be discussed individually.

In FIGS. 1-6 a first embodiment incorporating the present invention in a small volume wood stove is shown. FIGS. 7-10 show another preferred embodiment incorporating the present invention—a larger volume wood stove. Both embodiments may be incorporated in a fireplace insert, shown generally in FIG. 14. Further, the present invention may also be incorporated in a retrofit combustion air supply (FIG. 15) adapted to be fitted to existing combustors, for example, fireplaces.

The preferred stove embodiments of the present invention include an upright pedestal 14. Pedestal 14 supports a firebox 15. The firebox 15 is comprised basically of a base wall 16, a top wall 17, a front wall 18, and a back wall 19. Sidewalls 20 extend between the front and back walls 18, 19. The sidewalls 20 also span the vertical distance between the base wall 16 and the top wall 17. The firebox 15 is also common to the fireplace insert embodiment of FIG. 14.

In preferred stove and fireplace insert forms, the front wall 18 includes an opening 22 for receiving combustible fuel therethrough. The opening 22, in the preferred forms, also includes a door 23 mounted by hinges 24 to the front wall 18. The door may be selectively held in a closed position by means of a conventional latch and handle assembly 25. The door is advantageously provided with a glass viewing window 26, having an infrared coating to reflect heat into the firebox and thereby maximize temperatures within the combustion area at all burn rates.

A fire brick lining 27 is provided within the firebox 15 partially covering the sidewalls 20, back wall 19 and covering the base wall 16. The lining is used to insulate the metal enclosure surfaces from direct confrontation with heat and flames and to store and evenly distribute heat therefrom.

A baffle 30 is situated within the firebox 15. The preferred baffle 30 is inclined, leading from the back wall 19 upward and forwardly toward the front wall 18. The baffle 30 divides the firebox enclosure into an upper exhaust chamber 28 and a lower combustion chamber 29.

Baffle 30 includes a top surface 31 for supporting an insulation bat 32. In the first preferred forms, the insulation bat 32 is comprised of an approximately ½ inch thick mat of insulation material having a density of approximately 8 lbs. per cu. ft. such as "KAO-WOOL" TM produced by Thermal Ceramics at 2101 Old Savannah Road, Augusta, Ga.

Figure 7:
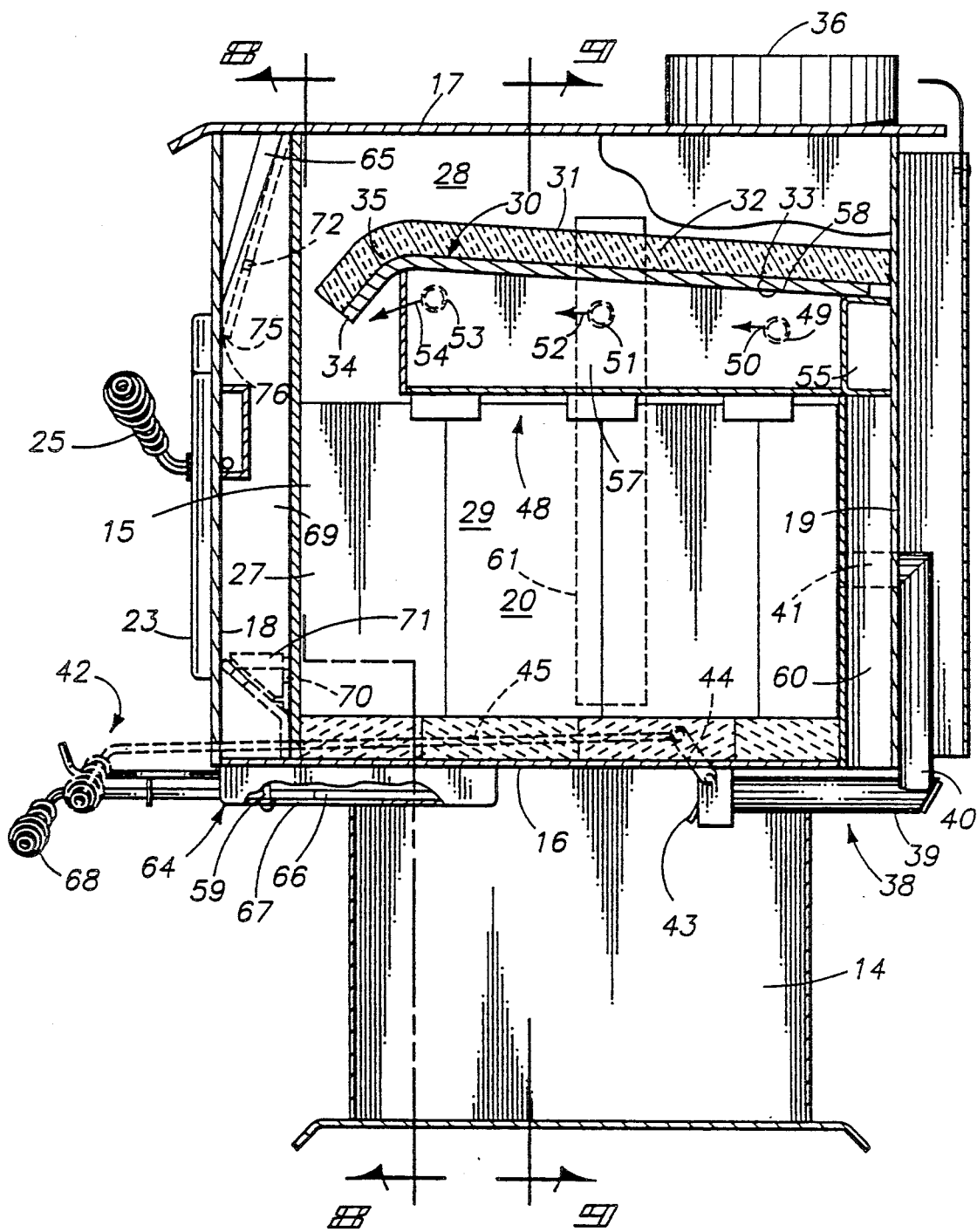
FIG. 7 is a sectional view similar to FIG. 3 only showing a second preferred form of the present invention.
Figure 8:
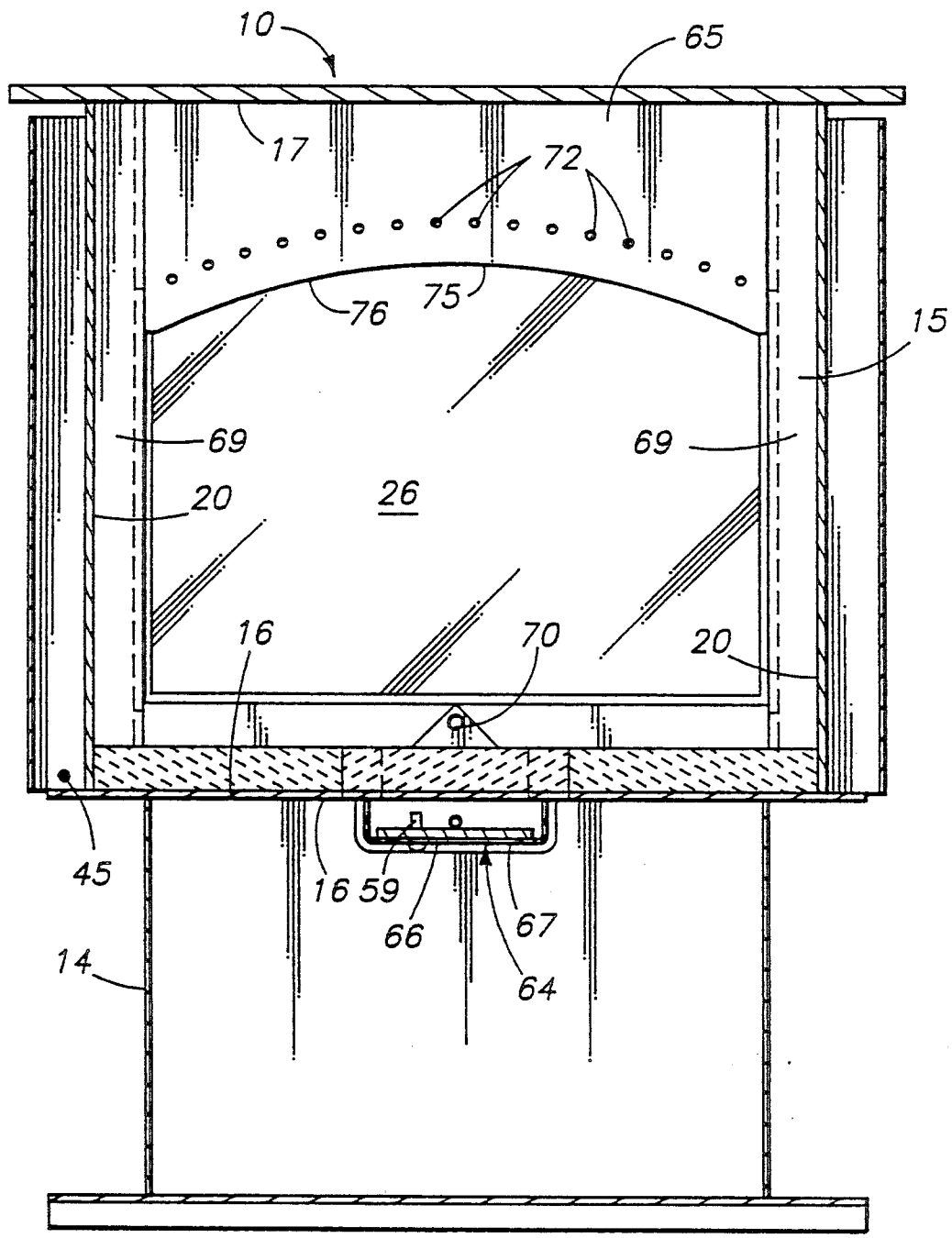
FIG. 8 is a view similar to FIG. 4 only showing the second preferred form.
Figure 9:
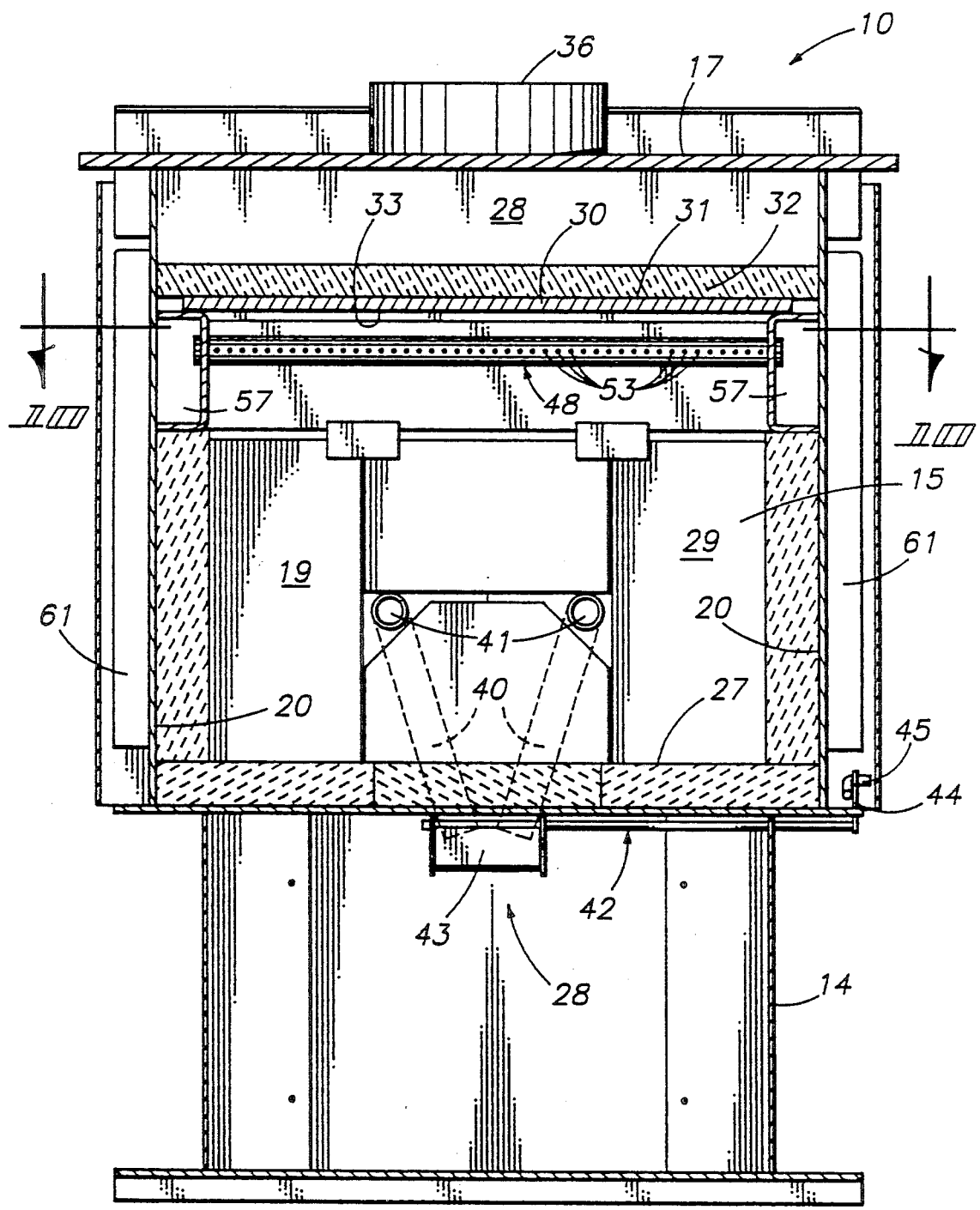
FIG. 9 is a view similar to FIG. 5 only showing the second preferred form of the invention.
Figure 10:
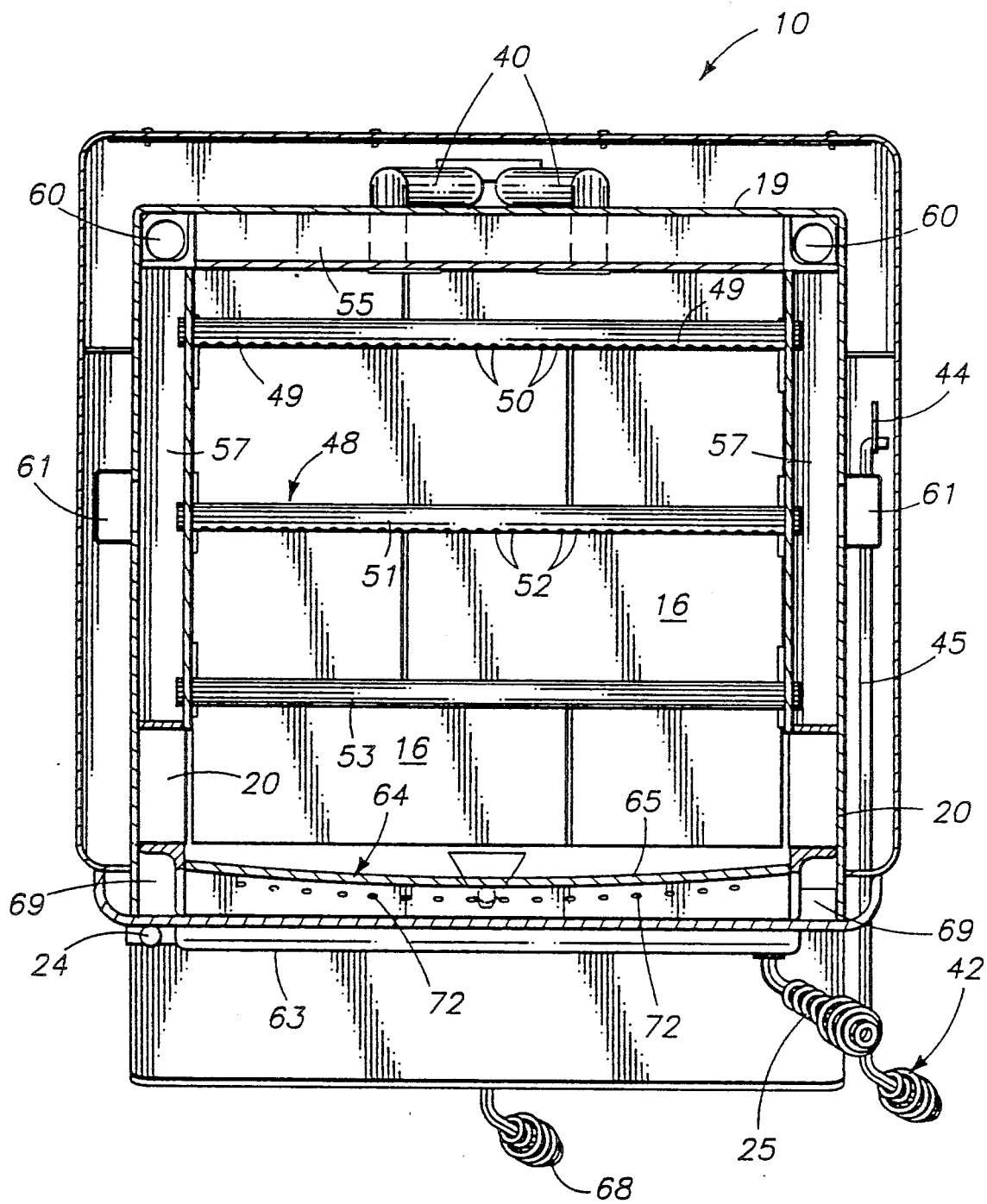
FIG. 10 is a view similar to FIG. 6 only showing the second preferred form of the invention.

It has been found that in larger stoves, such as the embodiment shown in FIGS. 7-9, that about one inch thickness of the insulator is beneficial to reflect heat back into the combustion chamber 29 from the baffle and thereby maximize the temperature within the combustion chamber 29 during all burn conditions, and thereby encouraging secondary and tertiary combustion above the fuel bed.

Figure 6:
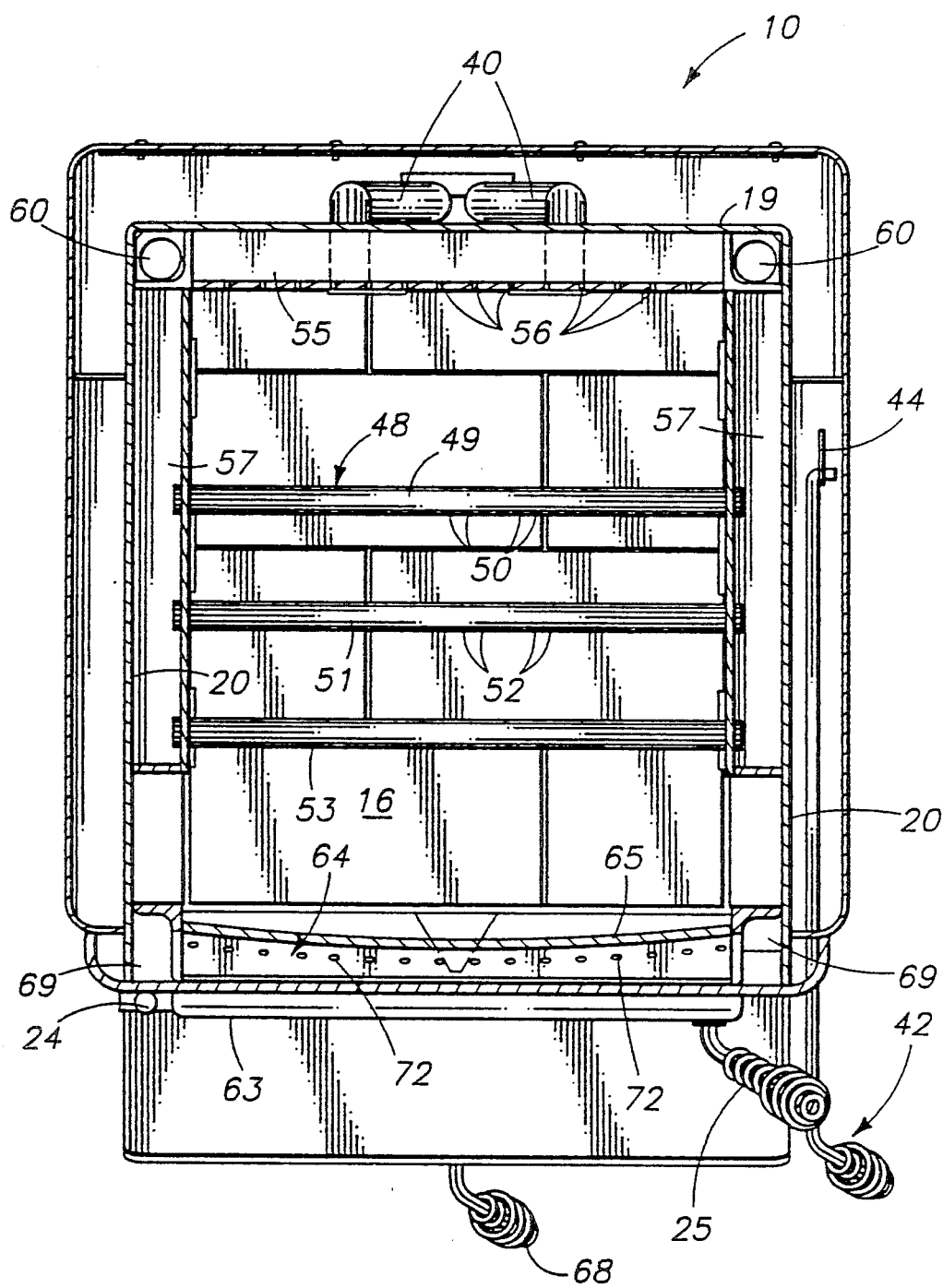
FIG. 6 is a sectional plan view taken substantially along the broken plane, 6—6 in FIG. 3.

In all forms, the preferred baffle includes a free edge 34 at a forward end of a downturned baffle section 35. The downturned section 35 is used to introduce turbulence in the gases at the interface between the exhaust chamber 28 and combustion chamber 29 (see FIG. 13). The free edge 34 forms an exhaust passage adjacent to the front wall 18 of the firebox through which exhaust gases pass from the combustion chamber 29 to the exhaust chamber 28 above. Exhaust gases in the embodiments illustrated in FIGS. 1, 6, and 14 are exhausted through a discharge 36 situated toward the back wall 19 from the leading baffle edge 34 and openly join the upper exhaust chamber 28 with the lower combustion chamber 29.

A first air supply 38 is provided for delivering primary air for combustion into the combustion chamber 29. In stove and fireplace insert forms, the preferred first air supply 38 includes a primary air delivery tube 39. The tube 39 extends from outside the firebox 15 to discharge ends 41 situated within the firebox elevationally between the baffle 30 and the base wall 16. The tube includes forked branches 40 that terminate in individual openings arranged at the above identified elevation in order to deliver primary combustion air over the fuel bed on the base wall 16. This provision is made in order to avoid direct impingement of primary air against the fuel bed and thereby avoid localized intense combustion of the fuel therein which results in elevated carbon monoxide emissions.

Figure 3:
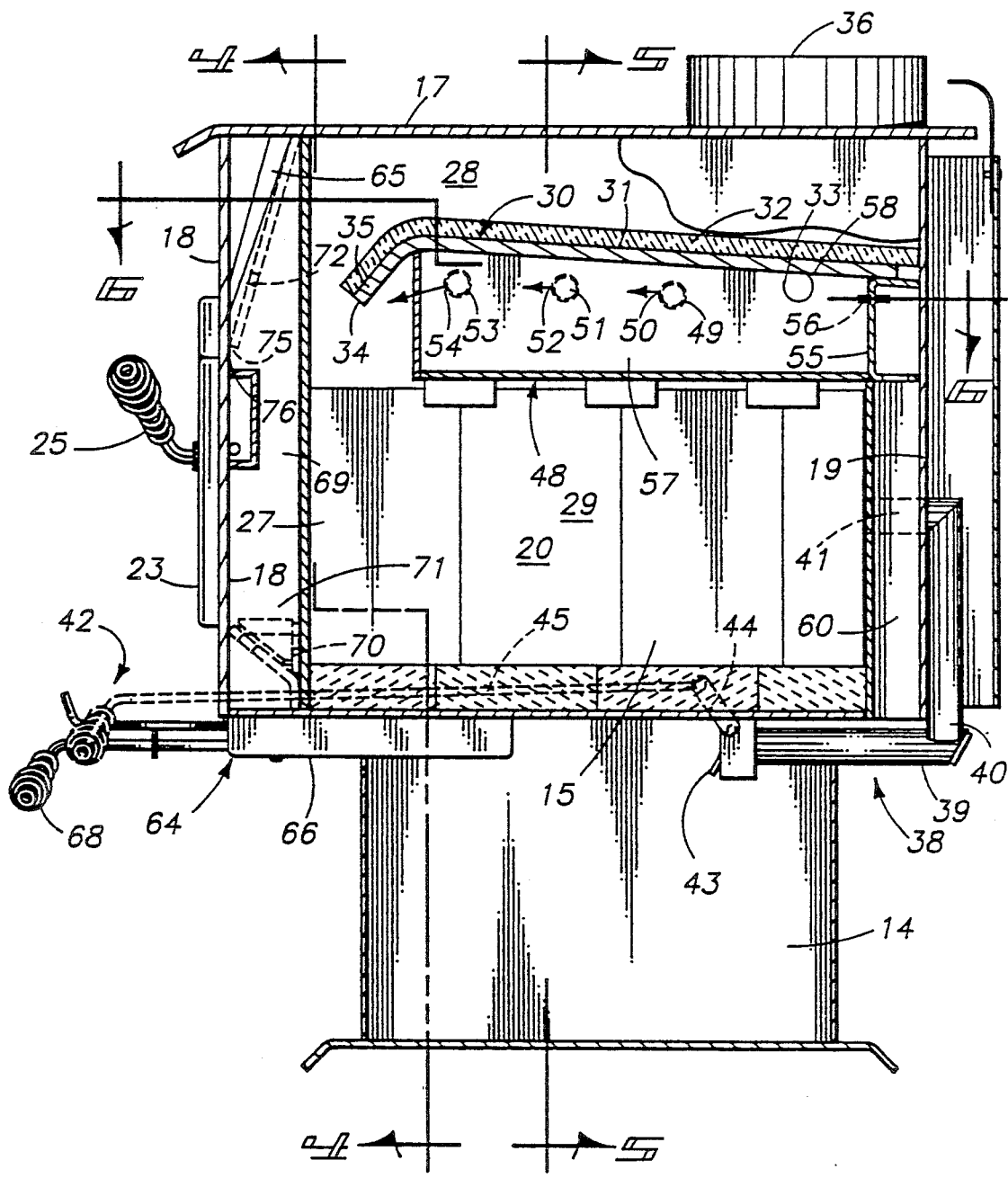
FIG. 3 is a sectional view taken substantially along line 3—3 in FIG. 1.
Figure 4:
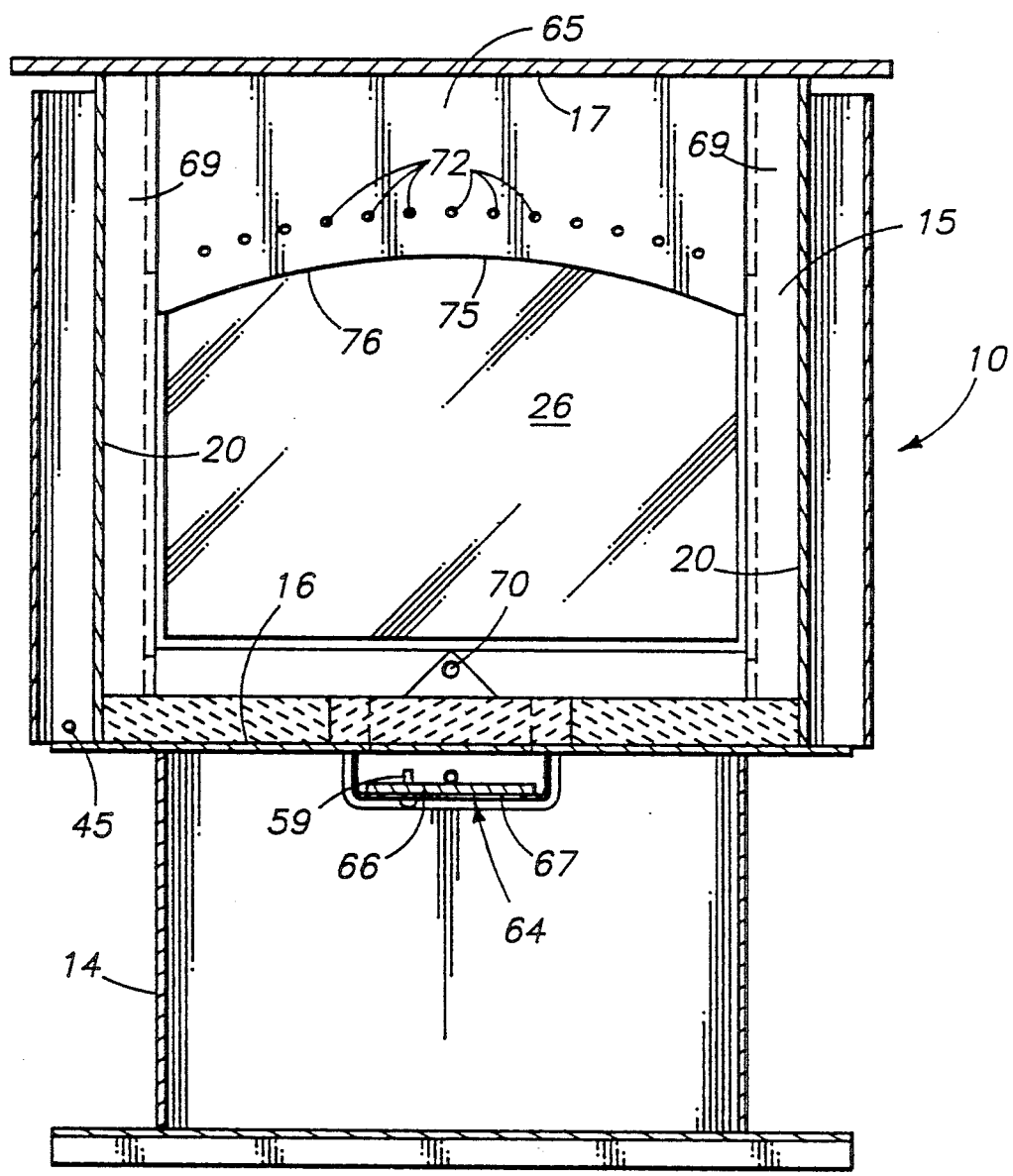
FIG. 4 is a sectional view taken substantially along line 4—4 in FIG. 3.
Figure 5:
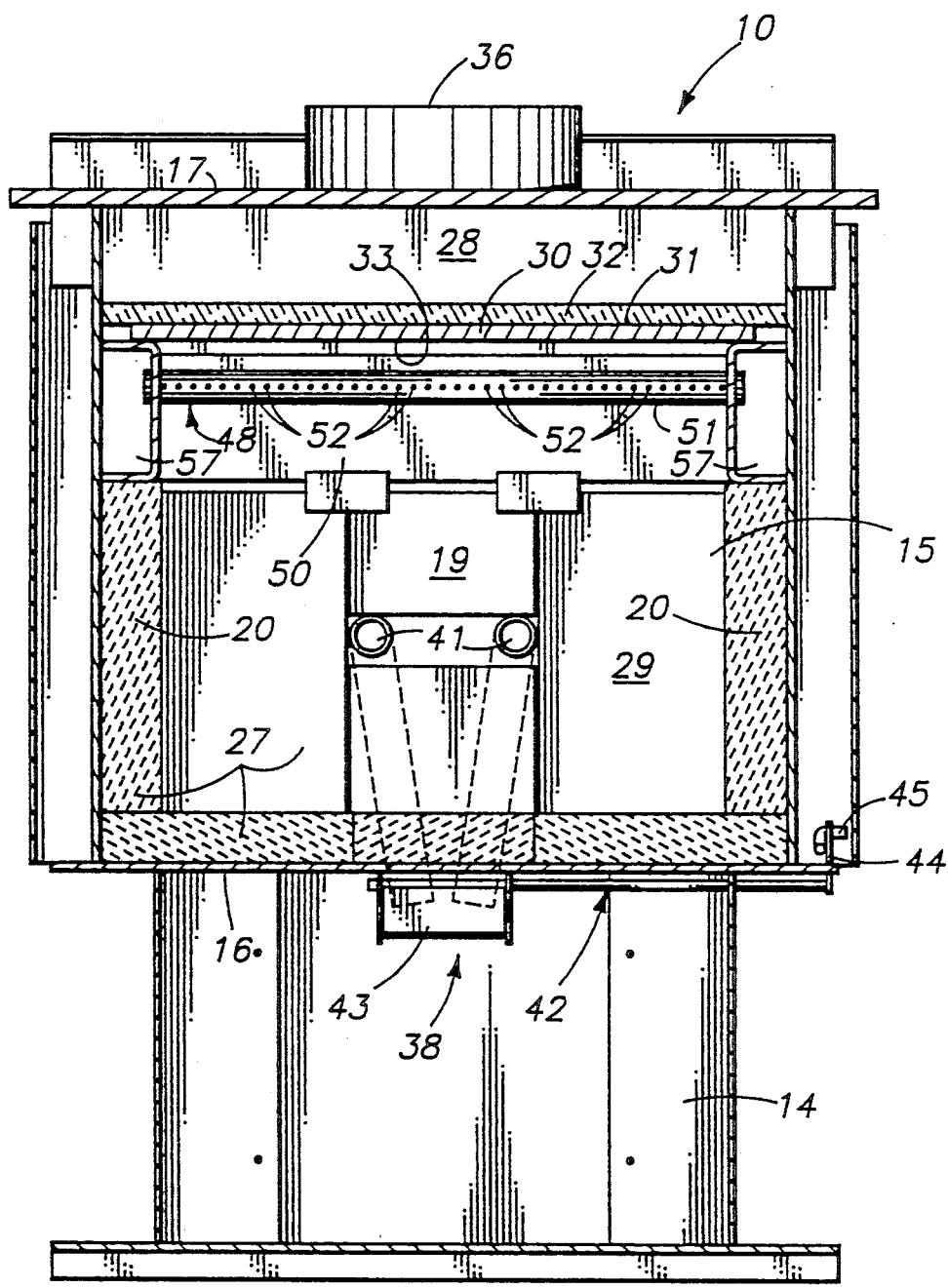
FIG. 5 is a sectional view taken substantially along line 5—5 in FIG. 3.
Figure 14:
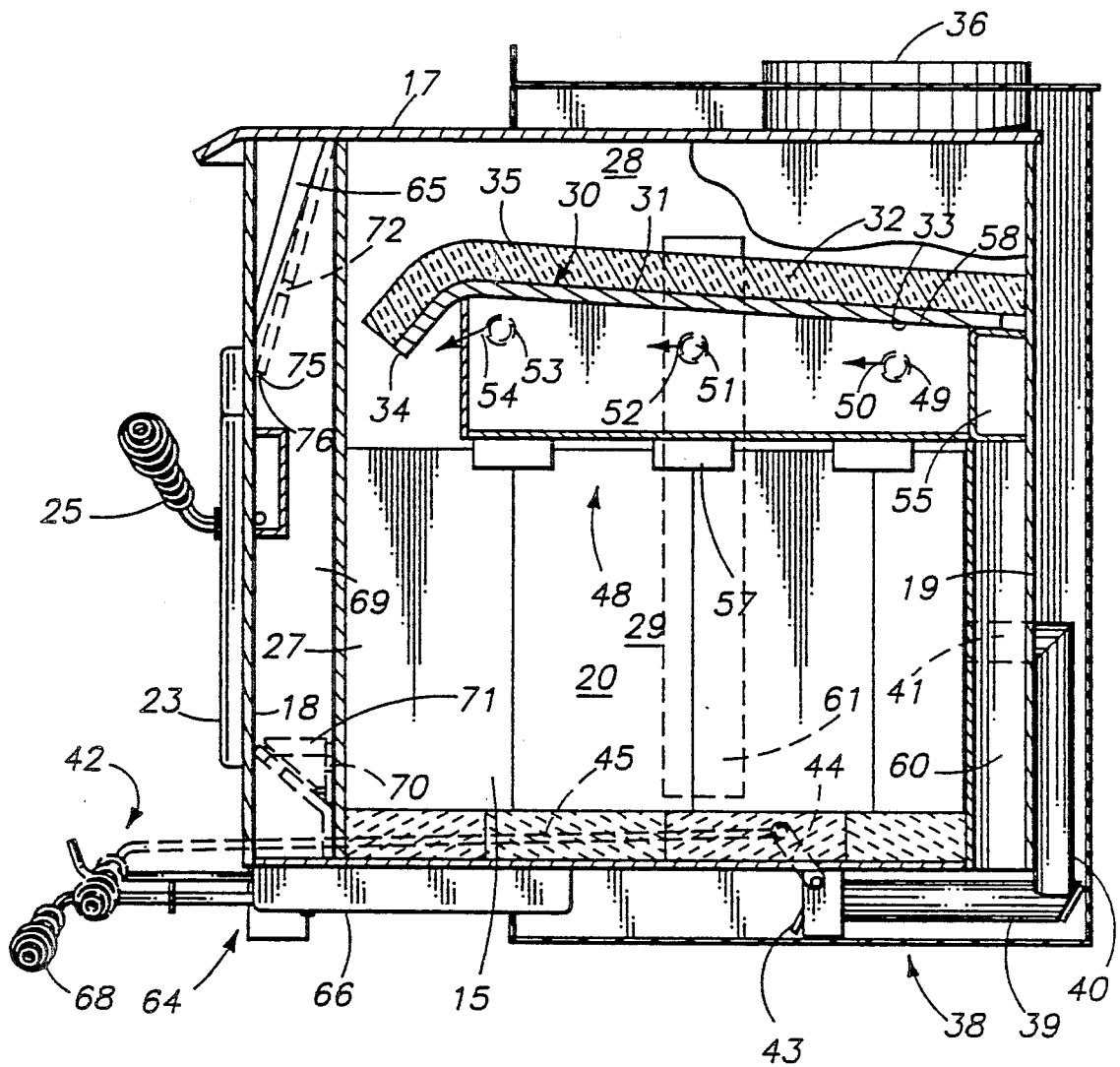
FIG. 14 is a sectional view of a fireplace insert embodiment.

At least the lower external portions of the primary air delivery tube are spaced clear of the firebox (FIGS. 3, 7 and 14). This assures that the primary air allowed into the firebox is at a minimum temperature and is not heated substantially by the firebox prior to entry. This arrangement enables delivery of a maximum concentration of oxygen to the fuel bed for primary combustion during start-up and medium to high burn rates.

A primary air control 42 is provided to selectively alter the amount of primary combustion air entering the firebox. The primary air control includes a draft plate 43 that is pivotably moved by a control arm 44 and an elongated user accessible operator rod 45. Plate 43 pivots in response to longitudinal motion of the operator rod 45 between open and closed conditions. The draft plate 43 can be opened completely to allow free access of primary air to the delivery tube 39, or it can be progressively closed for medium high, medium, medium low, and completely closed for low fire conditions.

A second air supply, provided in the preferred forms of the invention, is shown generally at 48. The second air supply 48 is provided to direct tertiary air (air to support certain secondary and tertiary combustion) within the firebox below the baffle and between the baffle free edge 34 and back wall 19.

In all preferred forms, the second air supply 48 is comprised of at least three tertiary air delivery tubes 49, 51, and 53. These three tubes are advantageously perforated and are present in all embodiments to play an important role to minimize emissions.

In all embodiments, a first tertiary tube 49 is situated downwardly adjacent to the baffle 30 and just forward of the back wall 19. Holes 50 of approximately 9/64 inch in diameter are equally spaced on ¼ inch centers along the length of the first tertiary tube 49 to bleed tertiary and secondary air into the firebox. These holes are oriented horizontally to direct air into the firebox and toward the free baffle edge 34.

Holes 50 are oriented substantially parallel to the baffle 30 and facing generally toward the baffle edge 34. This arrangement avoids initial turbulence and allows the tertiary and secondary air to blend in with the flow of exhaust gases passing forwardly and upwardly under the baffle and toward the free edge 34 thereof. Avoidance of turbulence at this point and at the point of emergence for air through the second tertiary tube 51 is important in order to maintain secondary and tertiary combustion below the baffle at low burn rates. Turbulence may otherwise have a tendency to "blow out" the secondary and tertiary flames above the fuel bed.

The second tertiary tube 51 includes a plurality of holes 52 substantially identical to those for the first tertiary tube 49. The holes are similarly spaced, sized, and oriented for the purposes set forth above.

The third tertiary tube is spaced closely adjacent to the free edge 34 of baffle 30. Tube 53 includes holes 54 that are tipped down and forwardly at an angle from the multi plane of the remaining holes 50 and 52. Holes 54 are tipped downwardly and are directed substantially toward the free baffle edge 34 (FIGS. 11, 13) in order to introduce a slight amount of turbulence toward the baffle edge. This turbulence cooperates with turbulence from air introduced through a secondary manifold (to be described below) and thereby assist combustion of all unburned materials before passage into the exhaust chamber. Holes 54 are slightly larger (about 3/16 inch diameter) and are spaced further (about ½ inch on center) than the holes 50 and 52 in the first and second tertiary tubes. This hole size and spacing assists in early stages after a fire is started to support combustion of otherwise unburned gases at the baffle edge, termed early manifold "light-off".

Means is provided to maintain a preferred temperature of air exiting through the holes 50, 52, 54, and holes 56 (where used). It is desirable to maintain a temperature of air exiting through holes 50, 52, and 54 within a range of approximately 250° F. to 650° F. This temperature range is substantially assured by provision of the number and spacing of tubes 49, 51 and 53, and by the manner in which air is delivered to these tubes as described below.

In all embodiments, the tubes 49, 51 and 53 are connected to common side tertiary chambers 57. These chambers 57 receive the open ends of the tubes 49, 51, 53 at opposite sidewalls 20 of the firebox. Air will freely enter into any of the three tubes from both side tertiary chambers. The chambers 57 are situated within the firebox. Air is fed to the side tertiary chambers 57 through first inside delivery ducts 60.

In the stove and insert embodiments, the air delivery ducts 60 extend downwardly substantially in the corners of the firebox between the back wall 19 and the sidewalls 20. The delivery ducts 60 are located inside the firebox in the rearward corners thereof. Bottom ends of the ducts are open to the atmosphere. Air will enter through the open duct ends and be heated as it rises to the side tertiary chambers 57.

In the retrofit air supply, ducts 62 are "L" shaped, extending down from the side chambers 57 then forward to front openings 63.

In the larger volume combustors, as shown in FIG. 7-10,15 and the retrofit of FIG. 15, a pair of outside delivery ducts 61 are also provided. The delivery ducts 61 are situated outside the firebox and lead from bottom ends opening to the atmosphere, upwardly to ends opening through the sidewalls and into the side tertiary chambers 57. Thus, cooler air enters the side tertiary chambers through openings substantially adjacent to the center or middle tertiary tube 51. This cooler air blends with the warmer air delivered through the inside delivery ducts 60 to support combustion in the area above the fuel bed and below the baffle. With the above arrangement, the range of air temperatures discharged from the first tube to the last will fall within a desirable range (250° F. to 650° F.) for all practical operating ranges of the combustor.

A back wall chamber 55 is provided in all preferred versions of the present invention, joining the two side tertiary chambers 57. The back wall chamber 55 openly connects the two side chambers 57 and the inside delivery ducts 60.

In the first preferred form (FIGS. 1-6) and the retrofit air supply (FIG. 15) the back wall chamber 55 includes holes 56 opening into the firebox. Like the tertiary tube holes 54, the holes 56 are preferably approximately 3/16 inch in diameter and are spaced evenly across the surface of the chamber 55. They are preferably situated approximately three quarters of an inch below the baffle plate 30 and are directed substantially horizontally as are the holes 50 and 52. The holes 56 in this version deliver tertiary and secondary combustion air to the firebox at a temperature within the range of 250° F. to 650° F. due to proximity to the inside delivery ducts 60. In the version shown (FIGS. 1-6), a smaller volume firebox is utilized, therefore requiring smaller amounts of secondary and tertiary air. In this form, the tertiary tubes are located closer to the baffle edge 34, due to the presence of the back wall holes 56. The arrangement of the tertiary tubes the back wall holes 56, the side chambers 57 and back chamber 55 therefore function as the means to maintain the desired tertiary and secondary air temperature exiting through the appropriate tertiary tube holes without requiring outside delivery ducts 61. Such ducts 61 are provided, however, on larger versions (FIGS. 7, 15 and 16) where larger volume fireboxes are utilized.

A third air supply means is provided with the stove and insert embodiments of the present invention and is generally shown at 64 in the drawings. The third air supply means is situated within the firebox in order to deliver secondary combustion air and to direct an "air wash" against the inward surface of the window 26.

Third air supply means 64 includes a secondary distribution duct 65 in the form of a manifold plate arranged across the front wall in the elevational vicinity of the free baffle edge 34. The manifold plate receives air through ducts 69 that extend around the front fuel opening 22 from a controlled outward opening 67 (FIG. 7). The triangular opening 67 (FIG. 7) is selectively closed by a rectangular draft plate 66 to facilitate fine control of the amount of air entering. A stop 59 is positioned to prevent the plate 66 from entirely closing off the secondary air supply and thereby causing high emissions at low fire burn settings.

A bottom air bleed hole 70 (FIG. 12, 4, 8) is situated along the duct 69. The hole 70 is substantially centered below the firebox fuel opening 22 and is directed toward the fuel bed. Air delivered through this hole is used for primary combustion and is used at critical start-up times during low burn conditions.

The secondary distribution duct or manifold plate 65 is located in the passageway for exhaust gases between the front wall 18 and the free baffle edge 34. The manifold air wash plate 65 includes a series of 1 inch on center secondary discharge holes 72 of approximately ¼ inch diameters. The holes 72 are angled toward the base wall 16 and the baffle edge 34. These holes 72 direct secondary combustion air into the firebox in the vicinity of the passageway formed between the baffle edge 34 and front wall 18. This is done to create turbulence in that vicinity and to introduce secondary combustion air to support final combustion of unburned gases and particulates before the exhaust gases pass over the baffle edge 34 and into the exhaust chamber above the baffle.

The secondary distribution manifold plate 65 includes a lower edge 75 that is spaced slightly away from the front wall 18 to form an air wash opening 76 (FIG. 13). The air wash opening is provided to direct air long the rearward facing surface of the door 23 and viewing glass 26. The air wash thus serves a dual function to cool and clean the glass surface and to provide secondary and primary combustion air within the firebox. Air entering through the air wash opening 76 is directed downwardly across the face of the glass 26 and is eventually drawn toward the combustion area where it mixes with burned and unburned gases to assist both primary and secondary combustion in the forward areas of the firebox.

Operation of the present stove and insert embodiments may now be easily understood from the above technical description.

In the stove and insert embodiments, the door 23 is opened and combustible material is placed within the firebox 15 along the base wall 16. The fire is then started in the usual manner. As the fire initially starts, the primary air control 42 is opened to permit adequate air for combustion within the firebox. Additionally, the draft plate 66 is moved to a full open position to facilitate admission of a sufficient amount of air into the firebox to facilitate start-up. The air bleed hole 70 is particularly useful at this time to deliver air to support primary start-up combustion of the fuel. The combustor is allowed to burn open for a short period of time in order to allow the combustible materials to fully ignite and to warm the interior of the firebox.

Once a brisk fire has been obtained, the controls may be selectively adjusted to control combustion to a desired rate. If a hot fire is desired, all air supplies are left open, the fire will continue to burn relatively freely.

If a "medium high" fire is desired, the primary air control is closed so no air is supplied directly to the burning fuel. This is done simply by operating the control 42 to shift the draft plate 43 a closed position. The draft plate 66 of the secondary supply is left open. The fire will correspondingly diminish to a stable medium high burn rate.

During this time, as in all burn settings, the tertiary ducts 49, 50, 53 and holes 56 in the smaller volume stoves remain open, as there is no need to control the amount of air delivered through these ducts. Thus, a supply of secondary and tertiary air is made available through the second air supply to maintain stable combustion of gases that would otherwise remain unburned during the medium burn rate.

To achieve a medium low burn rate, the primary control is left closed and adjustments are made to the secondary air control to move the plate 66 close to but not touching the stop 59. This decreases flow of secondary and primary air. A stable medium low burn rate is thereby achieved, with attendant low emissions.

Finally, if "low" burn rate is desired, the primary control is left closed and the plate 66 is pulled against the stop 59, thereby allowing only enough primary and secondary air to enter to maintain a stable low burn rate. Primary air is delivered only through the primary bleed hole 70. Again, while less air is supplied to support primary combustion, secondary combustion and tertiary combustion remain active due to provision of the tertiary tubes and the relationship of such tubes to the baffle and the exhaust passage ahead of the leading baffle edge 34. This produces a stable low burn rate with attendant low emissions.

All settings, the air temperature through the relationship of the tertiary tubes and the air intake to such tubes is maintained within the desired range between 250° F. and 650° F. The air entering at this temperature includes a sufficient oxygen density support combustion whereas air entering at higher temperatures would offer a rarified oxygen atmosphere caused by seperation of the oxygen molecules due to heat expansion. Air entering the firebox through the second air supply 48 is maintained within the above temperature range while the temperature within the firebox itself is held at a maximum for the selected burn rate through provision of the insulated baffle 30, and the reflective infrared surface on the door glass 26. The high temperature within the firebox combustion chamber serves to maintain secondary combustion while the cooler oxygen within the air entering by way of the second air supply 48 continually supports stable combustion without incurring "blowouts" or "chugging" due to air starvation and replenishment within the areas of secondary and tertiary combustion just below the baffle. This is attributed to the multiplicity of tertiary tubes, their spacing as shown, and the direction of air flow from the tubes.

The retrofit combustion air system embodiment of the present invention (FIG. 15) is provided to reduce emission in existing combustors, primarily fireplaces. It therefore differs from the stove and insert embodiments in that the existing combustion chamber of the fireplace is used to form a firebox in which the retrofit system is placed. This unit makes use of similar second air supply 48, including the three tertiary air tubes 49, 51 and 53, and the perforated back wall chamber 55 connected by side chambers 57. "L" shaped ducts 62 are mounted to the sidewalls 20 to feed air from the front of the fireplace to the second air supply 48. Advantageously, outside delivery ducts 61 are provided to deliver cool air to the side chambers from outside surfaces of sides 20.

Primary air is supplied through the front of the fireplace which may be supplied with conventional doors (not shown). A primary air diverter bar 85 extends across the unit between the open ends of the "L" shaped ducts to deflect most of the incoming air away from direct impingement with the fuel bed. Holes 89 are provided to allow a portion of the primary air to feed directly to the fire to assist initial start-up combustion.

Operation of the retrofit unit is similar to the stove and insert embodiments described above, but without provision of the secondary air supplies 65. Some secondary air is supplied by operation of the diverter bar 85, which deflects a part of the incoming air upward to mix with the heated gases passing under the baffle 30 and over its free edge 34. Since no controls are provided, the air supplies operate according to the draft pressure of the fireplace and whatever door or screen is placed over the fireplace opening. The tertiary tubes supply air heated to the desired temperature range to assist burning of gases and particulates before they pass over the free baffle edge and raise to the fireplace flue. The retrofit unit therefore dramatically reduces the amount of unburned gases and particulates that would otherwise be allowed to pass into the atmosphere.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

We claim:

1. A combustor, comprising:
   a firebox defined by a base wall, a top wall, a front wall, a rear wall, and side walls extending between the base wall and the top wall;
   an opening along the front wall for enabling fuel to be loaded into the firebox;
   an upwardly inclined baffle in the firebox, substantially spanning the distance between the side walls, leading forwardly and upwardly from the rear wall, and elevationally dividing the interior of the enclosure into a lower fuel combustion chamber below the baffle and an upper exhaust chamber above the baffle;
   wherein the baffle includes a free edge forming an exhaust passage adjacent the front wall of the firebox, the passage openly connecting the fuel combustion chamber and the exhaust chamber;
   an insulator on the baffle for reflecting heat within the firebox into the combustion chamber;
   a first air supply means for delivering primary combustion air to the combustion chamber;
   a second air supply distributor for delivering air to support combustion of unburned gasses within an area under the baffle between the free edge thereof and the back wall of the firebox, including three tertiary air supply tubes spaced apart below the baffle, with two of said tubes including a teritary air delivery opening therein oriented toward the free baffle edge and one of said tubes including an opening angularly oriented toward the free baffle edge and downwardly toward the base wall; and said tertiary chambers at opposed ends of the three tertiary air supply tubes for supplying air to the three tertiary air supply tubes; and at least one delivery with an end opening outside the firebox and an end opening into the side tertiary chambers.

2. A combustor as claimed by claim 1 further comprising a back chamber along the back wall joined with the side chambers; and wherein the back chamber includes at least one tertiary air outlet formed therein downwardly adjacent to the baffle and facing toward the free baffle edge.

3. A combustor as claimed by 1 further comprising a third air supply means for delivering secondary combustion air into the firebox forwardly adjacent the baffle to support secondary combustion of unburned gases within an area adjacent the baffle and exhaust passage.

4. A combustor as claimed by claim 1 wherein the tubes are parallel to one another.

5. A combustor as claimed by claim 1 wherein the tubes are formed on axes and wherein the tube axes are substantially parallel to the free baffle edge.

6. A combustor as claimed by claim 1 wherein at least one of the tubes includes a plurality of tertiary air delivery openings oriented to discharge tertiary combustion air in a stream substantially parallel to the baffle.

7. A combustor as claimed by claim 1 wherein two of the tubes are adjacent to the back wall and each includes an opening oriented to discharge tertiary combustion air in a stream substantially parallel to baffle, and wherein a third tube of the three is situated rearwardly adjacent to the free baffle edge and includes at least one opening oriented to discharge tertiary air in a stream angled downwardly toward the bottom wall and forwardly toward the front wall.

8. A combustor as claimed by claim 1 further comprising a primary air baffle bar along the bottom wall adjacent the front opening and front wall.

9. A combustor, comprising:
a firebox enclosure having a base wall, a top wall, a front wall, a rear wall, and side walls extending between the base wall and the top wall;
an opening along one of the walls for enabling fuel to be loaded into the firebox;
a baffle in the enclosure intermediate the top and base wall and dividing the interior of the enclosure into a lower fuel combustion chamber below the baffle and an upper exhaust chamber above the baffle;
wherein the baffle includes a free edge forming an exhaust passage adjacent one of the walls of the firebox, the passage openly connecting the fuel combustion chamber and the exhaust chamber;
an insulator on the baffle for reflecting heat within the firebox into the combustion chamber;
a discharge formed through one of the walls and opening into the exhaust chamber to discharge exhaust gases therethrough;
a first air supply means for delivering primary combustion air to the combustion chamber;
a second air supply distributor for delivering air to support combustion of unburned gases within an area under the baffle, and including a first duct within the firebox leading from an end opening outside the firebox to the second air supply distributor for delivering air heated by combustion within the firebox to the second air supply distributor; and a second duct outside the firebox leading from an end opening outside the firebox to the second air supply distributor for delivering air substantially unheated by combustion within the firebox to the second air supply distributor; and a third air supply means for delivering secondary combustion air into the firebox adjacent the baffle therein to support secondary combustion of unburned gases within an area adjacent the baffle and exhaust passage.

10. A combustor as claimed by claim 9 wherein the first and second ducts include means for maintaining an intake air temperature range of between 250 and 650 degrees fahrenheit.

11. A combustor as claimed by claim 9 wherein the first duct is situated within the firebox along the back wall thereof, and wherein the second duct is situated outside the firebox along a side wall thereof.

12. A combustor as claimed by claim 9 wherein the second air supply distributor includes three tertiary air distribution tubes connected to the first and second ducts and wherein the tubes are substantially parallel to one another and to the plane of the baffle.

13. A combustor as claimed by claim 9 wherein the second air supply distributor includes three tertiary air distribution tubes connected to the first and second ducts and wherein two of the tubes include discharge holes oriented substantially horizontally and a third tube of the three is situated adjacent the baffle edge with at least one discharge hole angled toward the exhaust passage.

14. A combustor as claimed by claim 9 wherein the second air supply distributor includes three tertiary air distribution tubes connected to the first and second ducts and wherein a third tube of the three is situated adjacent to the baffle edge with a discharge hole angled toward the front wall at a downward and forward angle.

15. A combustor as claimed by claim 9 wherein the second air supply distributor includes three tertiary air distribution tubes connected to the first and second ducts and further comprising a side chamber connecting the three tubes to a common air supply.

16. A combustor as claimed by claim 9 wherein the second air supply distributor includes three tertiary air distribution tubes connected to the first and second ducts and further comprising a side chamber connecting the three tubes to a common air supply and wherein the three tubes are spaced apart with axes substantially parallel to the free edge of the baffle.

17. A combustor, comprising:
a firebox enclosure having a base wall for supporting a fuel bed, a top wall, a front wall, a rear wall, and side walls extending between the base wall and the top wall;
an opening along one of the walls for enabling fuel to be loaded into the firebox;
a baffle in the enclosure intermediate the top and base wall and dividing the interior of the enclosure into a lower fuel combustion chamber below the baffle and an upper exhaust chamber above the baffle;
wherein the baffle includes a free edge forming an exhaust passage adjacent one of the walls of the firebox, the passage openly connecting the fuel combustion chamber and the exhaust chamber;

an insulator on the baffle for reflecting heat within the firebox into the combustion chamber;

a discharge formed through one of the walls and opening into the exhaust chamber to discharge exhaust gases therethrough;

a first air supply means for delivering primary combustion air to the combustion chamber;

a second air supply distributor for delivering air to support combustion of unburned gases within an area under the baffle;

a third air supply means for delivering secondary combustion air to the combustion chamber adjacent the baffle therein to support secondary combustion of unburned gases within an area adjacent the baffle and exhaust passage;

wherein the first air supply means includes a primary air delivery duct means leading from an end open to the atmosphere outside the firebox to an end within the firebox adjacent the rear wall, and oriented to direct primary combustion air substantially horizontally into the firebox above the fuel bed and below the baffle, to avoid direct impingement of primary air against the fuel bed, such that localized combustion of fuel on the fuel bed is avoided.

18. A combustor as claimed by claim 17 wherein the primary air delivery duct means is comprised of a forked delivery tube with paired discharge ends opening into the firebox.

19. A combustor as claimed by claim 17 further comprising primary air control means for selectively controlling the amount of air entering through the primary air delivery duct means.

20. A combustor as claimed by claim 17 wherein the primary air delivery duct means is comprised of a forked delivery tube mounted outside the firebox with paired discharge ends opening into the firebox; and further comprising primary air control means for selectively controlling the amount of air entering through the forked delivery tube.

21. A combustor as claimed by claim 17 wherein the primary air delivery duct means includes a forked primary air delivery tube mounted outside of firebox and having paired discharge ends opening into the firebox.

22. A combustor as claimed by claim 17 wherein the primary air delivery duct means includes a primary air delivery tube mounted outside of firebox with at least one discharge end opening into the firebox along the back wall and situated approximately midway between the bottom wall and the top wall.

23. A combustor, comprising:
a firebox enclosure having a base wall, a top wall, a front wall, a rear wall, and side walls extending between the base wall and the top wall;
an opening along one of the walls for enabling fuel to be loaded into the firebox;
a baffle in the enclosure intermediate the top and base wall and dividing the interior of the enclosure into a lower fuel combustion ∞chamber below the baffle and an upper exhaust chamber above the baffle;
wherein the baffle includes a free edge opposite an adjacent one of the firebox walls and forming an exhaust passage openly connecting the fuel combustion chamber and the exhaust chamber;
an insulator on the baffle for reflecting heat within the firebox into the combustion chamber;

a discharge formed through one of the walls and opening into the exhaust chamber to discharge exhaust gases therethrough;

a first air supply means for delivering primary combustion air to the combustion chamber;

a second air supply distributor for delivering air to support combustion of unburned gases within an ares under the baffle;

a third air supply means for delivering secondary combustion air to the combustion chamber adjacent the baffle therein to support secondary combustion of unburned gases within an area adjacent the baffle and exhaust passage;

wherein the third air supply means includes a secondary air distribution duct leading from a selectively controlled intake end outside the firebox to a discharge opening within the firebox; and wherein the secondary distribution duct includes a secondary discharge hole than is oriented angularly to direct secondary combustion air toward the area between the baffle and said one of the firebox walls.

24. A combustor as claimed by claim 23 wherein the secondary distribution duct includes an air wash opening formed in the shape of an arc and oriented to discharge air in a direction angled downward toward the bottom wall.

25. A combustor as claimed by claim 23 wherein the secondary discharge hole is angled downward toward the bottom wall, and further comprising an air wash opening formed by the secondary distribution duct and directed toward said adjacent one of the firebox walls.

26. A combustor as claimed by claim 23 wherein the adjacent one of the firebox walls is the front wall and the opening is formed along the front wall and further comprising:
a door along the front wall mounted to the firebox to be selectively opened to enable loading of fuel through the opening;
wherein the secondary distribution duct is mounted above the door;
wherein the secondary discharge hole is angled downward toward the bottom wall and away from the door; and
an air wash opening formed by the secondary distribution duct and directed toward the door and the bottom wall.

27. A combustor, comprising:
a firebox enclosure having a base wall, a top wall, a front wall, a rear wall, and side walls extending between the base wall and the top wall;
an opening along one of the walls for enabling fuel to be loaded into the firebox;
a baffle in the enclosure intermediate the top and base wall and dividing the interior of the enclosure into a lower fuel combustion chamber below the baffle and an upper exhaust chamber above the baffle;
wherein the baffle includes a free edge forming an exhaust passage with an adjacent one of the firebox walls, the passage openly connecting the fuel combustion chamber and the exhaust chamber;
an insulator on the baffle for reflecting heat within the firebox into the combustion chamber;
a discharge formed through one of the walls and opening into the exhaust chamber to discharge exhaust gases therethrough;
a first air supply means for delivering primary combustion air to the combustion chamber, including a primary air delivery duct means leading from an end open to the atmosphere outside the firebox to an end within the firebox above the fuel bed and below the baffle, to avoid direct impingement of primary air against the fuel bed, whereby localized combustion of fuel on the fuel bed is avoided;

a second air supply distributor for delivering air to support combustion of unburned gases within an area under the baffle between the free edge thereof and the back wall of the firebox, including three tertiary air supply tubes spaced apart below the baffle, with each including at least one tertiary air delivery opening therein oriented toward the free baffle edge; and side tertiary chambers at opposed ends of the three tertiary air supply tubes for supplying air to the three tertiary air supply tubes; and at least one delivery duct with an end opening outside the firebox and an end opening into side tertiary chambers;

a third air supply means for delivering secondary combustion air to the combustion chamber adjacent the baffle therein to support secondary combustion of unburned gases within an area adjacent the baffle and exhaust passage, comprising a secondary air distribution duct leading from a selectively controlled intake end outside the firebox to a discharge opening within the firebox; and wherein the secondary distribution duct discharge opening is situated along said one of the firebox walls opposite to the free baffle edge.

28. A combustor air supply system, comprising:

an inclined baffle elevationally defining a lower fuel combustion area below the baffle and an upper exhaust area above the baffle;

side walls supporting the inclined baffle and including inwardly facing surfaces and oppositely facing outward surfaces;

wherein the baffle includes a forward free edge;

an insulator on the baffle for reflecting heat into the combustion area;

an air supply distributor for delivering air to support combustion of unburned gases within an area under the baffle rearward of the free edge thereof, including tertiary air supply tubes spaced apart below the baffle, with each including at least one tertiary air delivery opening therein facing toward the free edge of the baffle;

side tertiary chambers on the side walls at opposed ends of the tertiary air supply tubes for supplying air to the tertiary air supply tubes; and at least one delivery duct with an outer end exposed to the atmosphere to receive air therethrough and extending along the outward surface of an adjacent side wall to an outlet end opening into the side tertiary chambers.

* * * * *